United States Patent [19]

Bellian et al.

[11] Patent Number: 5,087,818

[45] Date of Patent: Feb. 11, 1992

[54] BETA SCINTILLATION PROBE

[75] Inventors: Joseph G. Bellian; Charles R. Hurlbut, both of Chesterland, Ohio

[73] Assignee: Bicron Corporation, Newbury, Ohio

[21] Appl. No.: 696,155

[22] Filed: May 6, 1991

[51] Int. Cl.$^5$ .............................................. G01T 1/20
[52] U.S. Cl. .................................. 250/361 R; 250/368
[58] Field of Search ................... 250/361 R, 367, 368, 250/487.1

[56] References Cited

U.S. PATENT DOCUMENTS

| 4,002,901 | 1/1977 | Coffin .............................. 250/361 R |
| 4,101,769 | 7/1978 | Bingo et al. ..................... 250/361 R |

OTHER PUBLICATIONS

"Field Tests of a Portable Tissue Equivalent Survey Meter for Monitoring Mixed Beta/Gamma Radiation Fields", Office of Nuclear Regulatory Research, Division of Radiation Programs and Earth Sciences, U.S. Nuclear Regulatory Commission, NUREG/CR-4553, EGG-2448, May 1986, Martz et al.

Primary Examiner—Janice A. Howell
Assistant Examiner—Richard Hanig
Attorney, Agent, or Firm—Pearne, Gordon, McCoy & Granger

[57] ABSTRACT

A skin equivalent structure is formed from an aluminized polyester window and a scintillator. The scintillator is chosen to scintillate at a wavelength different from that of most Cerenkov light. The scintillator light travels through a light pipe and one or more filters to a photomultiplier tube. Beta particles reaching the scintillator provide light that results in an electrical output from the tube that corresponds to the skin beta dose rate. The filters are chosen to remove the Cerenkov light. In addition, the light pipe may also be chosen to attenuate the Cerenkov light.

13 Claims, 3 Drawing Sheets

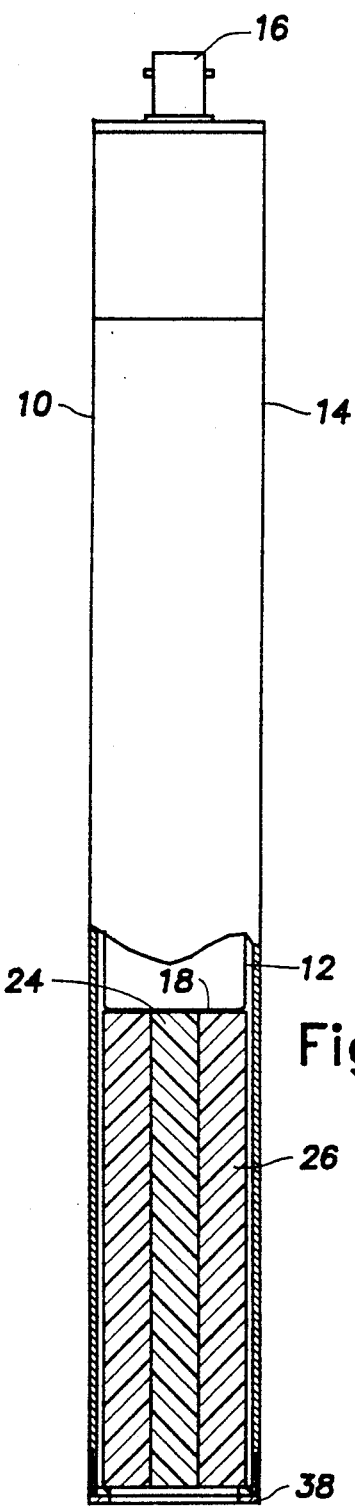
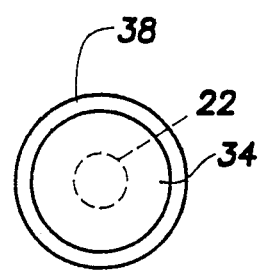
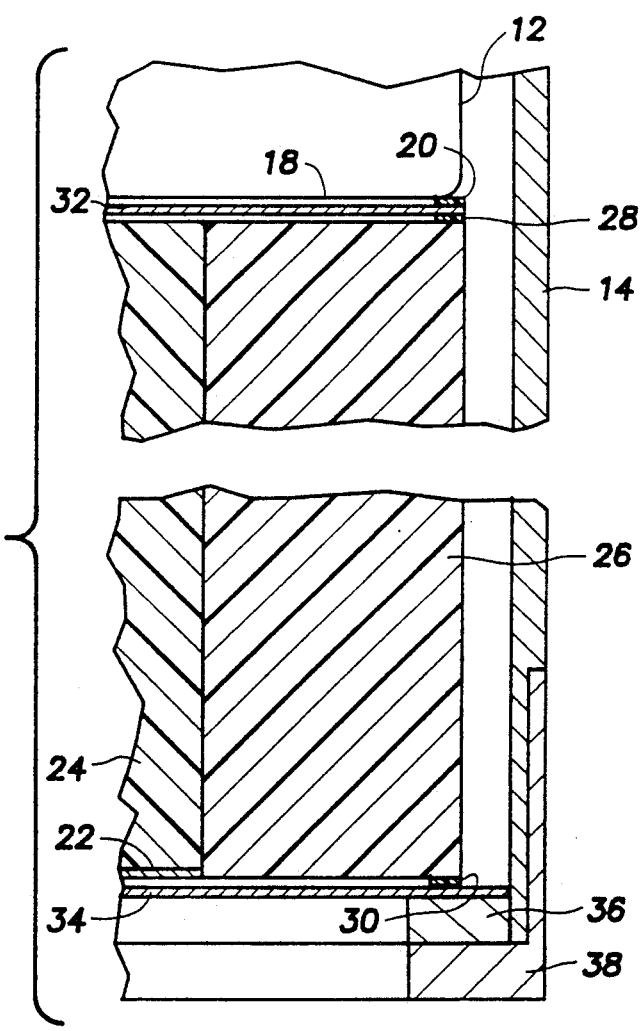

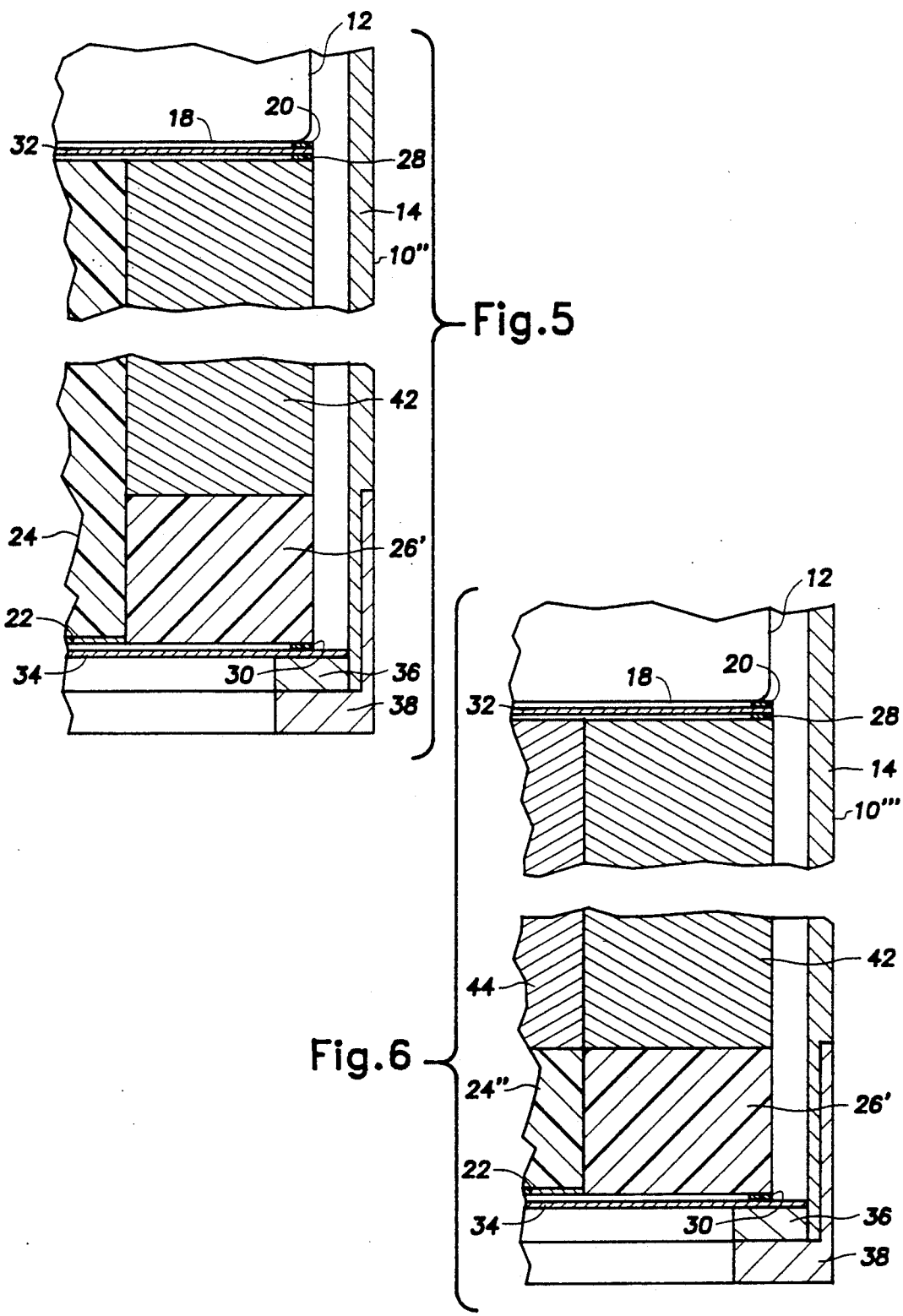

BETA SCINTILLATION PROBE

BACKGROUND OF THE INVENTION

1. Field of the Invention

The present invention relates to a scintillation probe for the measurement of beta dose rates. In particular, the invention minimizes the effects of higher energy particles, x-rays and gamma rays upon the measurement.

2. Description of the Prior Art

The beta dose to skin tissue is defined by the National Council on Radiation Protection as the dose to the thin layer of basal epithelial tissue lying at an average depth of 7 mg/cm$^2$ or, alternatively, by the International Commission on Radiological Protection as the dose to the skin tissue lying between 5 mg/cm$^2$ and 10 mg/cm$^2$.

It is known to use thin scintillators covered by an aluminized Dupont MYLAR window to provide a skin-equivalent structure for detecting beta particles. The scintillator is coupled to a photomultiplier by a tissue equivalent light pipe. Such a device is described in Martz et al, *Field Tests of a Portable Tissue Equivalent Survey Meter for Monitoring Mixed Beta/Gamma Radiation Fields*, Office of Nuclear Regulatory Research, Division of Radiation Programs and Earth Sciences, U.S. Nuclear Regulatory Commission, NUREG/CR-4553, EGG-2448, May 1986, and is incorporated herein by reference in its entirety.

Unfortunately, the output of the photomultiplier in this known device includes not only the skin equivalent beta dose rate, but also Cerenkov light from higher energy particles and electrons produced directly in the photomultiplier cathode by x-rays and gamma rays.

Because the Cerenkov light and the gamma ray and x-ray components exhibit characteristically narrow pulse shapes, sophisticated high speed electronics can be used to electronically remove their contribution. These electronics substantially increase the complexity and cost of the device.

SUMMARY OF THE INVENTION

The present invention provides a beta scintillation probe that rejects the Cerenkov light, gamma ray and x-ray components directly in the probe. This eliminates the need for complicated and expensive high-speed pulse discriminating circuitry.

The probe contains a light-opaque window and a scintillator communicating with the window. The window and scintillator together form a skin equivalent structure of between 5 mg/cm$^2$ and 10 mg/cm$^2$. The scintillator is adapted to scintillate in the presence of beta particles at a wavelength different than that of the Cerenkov light constituent.

The probe also contains a light pipe communicating with the scintillator. This light pipe conveys the light from the scintillator to an optical filter. This filter is adapted to block light at the wavelength of the Cerenkov light constituent.

A light detection means detects filtered light from the filter and provides an electrical signal representative of the beta dose rate.

In the preferred embodiment, the window is formed from at least one layer of aluminized polyester membrane.

One embodiment employs a scintillator that produces green light in response to the beta particles. For example, a Bicron Corporation BC-428 scintillator having a thickness of about 0.002 inches may be used. The filter may be, for example, an Eastman Kodak Company WRATTEN #3 filter, or equivalent, having a cut-off of 455 nanometers.

Another embodiment employs a scintillator that produces orange light in response to the beta particles. For example, a Bicron Corporation BC-430 scintillator having a thickness of about 0.002 inches may be used. The filter may be, for example, an Eastman Kodak Company WRATTEN filter #12, or equivalent, having a cut-off of 515 nanometers.

In one embodiment, the light pipe is comprised of a plastic that is transparent to beta particle scintillations from the scintillator but is absorbing to ultraviolet light. If a non-ultraviolet absorbing light pipe is used, an additional filter is used between the scintillator and the light pipe.

When a light detection means such as a photomultiplier tube is used, the light pipe is made long enough to reduce the amount of gamma rays and x-rays striking the photomultiplier cathode to an acceptable level. In addition, a portion of the light pipe may be formed of lead glass to absorb gamma and x-rays. Also, the probe may contain an opaque ring with a bore coaxially containing the scintillator and light pipe. A portion of the ring may be formed of lead to further shield the probe.

BRIEF DESCRIPTION OF THE DRAWINGS

FIG. 1 is a side elevation view with portions cut away of a probe according to the invention.

FIG. 2 is a bottom plan view of the probe of FIG. 1.

FIG. 3 is a fragmentary cross section view in larger scale taken from FIG. 1.

FIG. 5 is a fragmentary cross section view of another additional embodiment of a probe according to the invention.

FIG. 6 is a fragmentary cross section view of an still another additional embodiment of a probe according to the invention.

DESCRIPTION OF THE PREFERRED EMBODIMENTS

Figure 4:
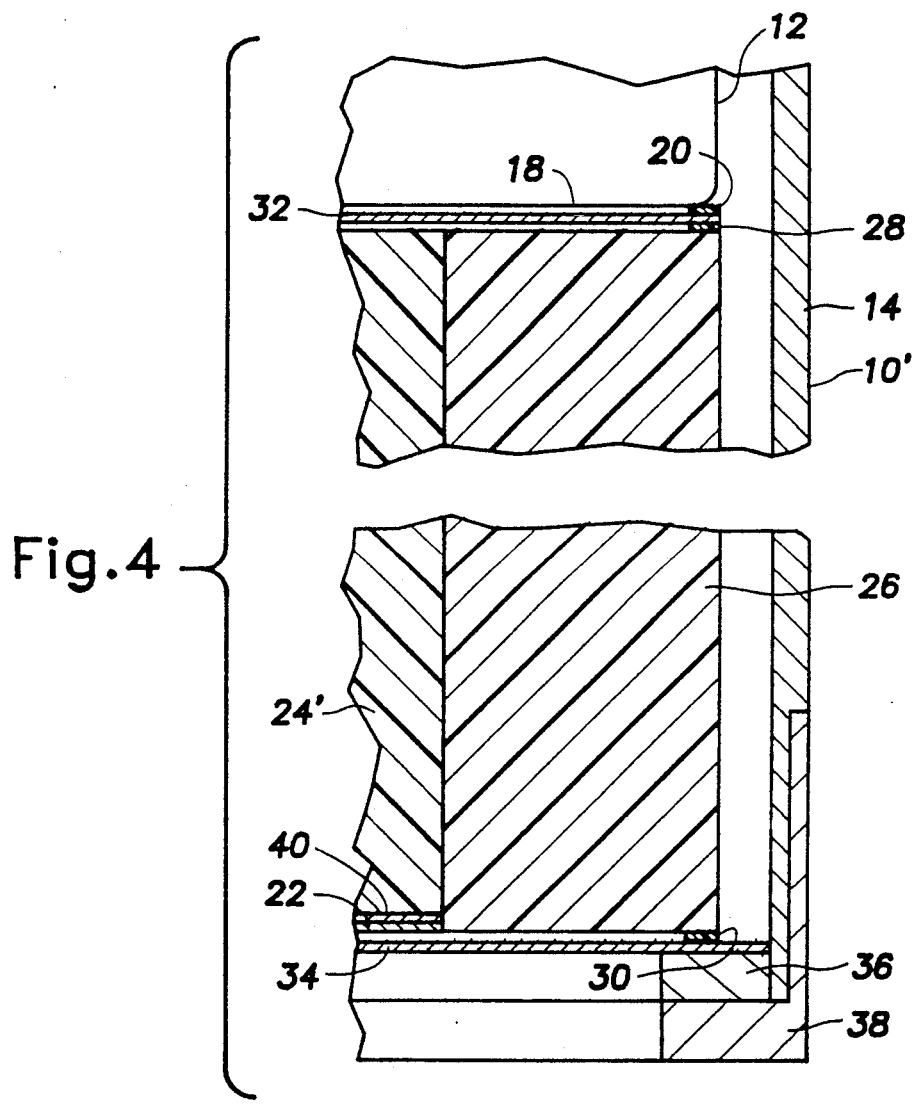
FIG. 4 is a fragmentary cross section view of an additional embodiment of a probe according to the invention.

Referring to FIGS. 1 through 3, a beta scintillation probe 10 according to the invention is depicted. A photomultiplier tube 12 is mounted within a light shield/housing 14. The tube 12 is connected to unshown measurement/power electronics via a BNC connector 16. The tube 12 may be, for example, 1⅛ inches in diameter and 4¼ inches in length. In the preferred embodiment, the tube 12 includes a wrapping of two rounds of mu-metal shielding.

The face 18 of the tube 12 has three equal-spaced spacers 20 adhesively attached about its circumference. The spacers 20 may be, for example, 0.010 inch-thick plastic.

A scintillator 22 is adhesively attached to one end of a light pipe 24. The light pipe 24 and the scintillator 22 are, for example, 1 cm$^2$ in cylindrical cross section (e.g. 0.4442 inches in diameter). This provides the probe with a wide angle view. The adhesive may be an epoxy such as Bicron Corporation BC-620.

The light pipe 24 may be, for example, a methyl methacrylate plastic such as Dupont LUCITE. Gamma rays and x-rays entering the light pipe drop off as the square of the distance travelled. It has been found that a light pipe 24 approximately 4 inches long provides adequate isolation of the photomultiplier tube 12 from the gamma rays and x-rays while providing a probe of reasonable length. As an alternative, an optical mirror/prism can be used in the light path, the gamma rays and x-rays continuing in a straight path.

Cerenkov light generated in the light pipe 24 is primarily in the ultraviolet range. To aid in eliminating the Cerenkov light, the light pipe 24 may be made ultraviolet light absorbing.

To differentiate light from the scintillator 22 from Cerenkov light, a scintillator 22 is used that scintillates at a wavelength different from Cerenkov light. For example, a green scintillator (e.g. Bicron Corporation BC-428 scintillator) or an orange scintillator (e.g. Bicron Corporation BC-430) may be used.

The light pipe 24 and scintillator 22 assembly may, for example, be painted with light-opaque paint except for the end of the light pipe 24 away from the scintillator 22. This paint may be, for example, Bicron Corporation BC-620.

The light pipe 24 and scintillator 22 assembly may, for example, be glued within an opaque plastic ring 26 having an inside diameter matching the assembly and an outside diameter of, for example, 1⅛ inches. The scintillator 22 is flush with the surface of one end of the ring 26 and the unpainted end of the light pipe 24 is flush with the other end of the ring 26. The ring 26 may be, for example, black Dupont LUCITE.

The ring 26 provides back scattering equivalent to surrounding muscle tissue, that is, it provides the necessary electron equilibrium.

Three equal-spaced spacers 28 are adhesively attached about the circumference of the end of the ring 26 closest to the tube 12. Also, three equal-spaced spacers 30 are adhesively attached about the circumference of the other end of the ring 26. The spacers 28, 30 may be, for example, 0.010 inch-thick plastic.

A filter 32 is placed between the spacers 20 and the spacers 28. The filter 32 may be secured in place with an adhesive such as silicon rubber. The filter 32 is chosen to filter out Cerenkov light while passing the light from the scintillator 22, for example, an Eastman Kodak Company WRATTEN filter #3 for a BC-428 scintillator or a WRATTEN #7 for a BC-428 scintillator. In general, the filter 32 should at least block light at blue and shorter wavelengths. The filter 32 may be, for example, 1⅛ inches in diameter.

A window 34 is adhesively attached to a window ring 36 which is in turn adhesively attached to an end cap 38. The end cap 38 containing the window 34 and the window ring 36 is adhesively attached on the end of the housing 14. The window 34 abuts the spacers 30. In the preferred embodiment, the window ring 36 and the end cap 38 are formed of plastic.

The window 34 may be advantageously formed from five layers of aluminized polyester membrane such as polyethylene terephthalate (e.g. Dupont MYLAR). Each layer of the membrane may have, for example, a diameter of 1⅛ inches and a thickness equivalent to a depth of 0.96 mg/cm$^2$. The aluminum coating makes the window light-opaque and provides electrical shielding.

To form a skin equivalent structure, the scintillator 22 and window 34 should have a combined depth of between 5 mg/cm$^2$ and 10 mg/cm$^2$. To achieve at least a 9 mg/cm$^2$ equivalent, a scintillator 22 of Bicron Corporation BC-428 material would have a thickness of 5 mg/cm$^2$ (i.e. 0.002 inches) when used with a window 34 formed of 5 layers of 0.96 mg/cm$^2$ MYLAR.

In operation, beta particles pass through the window 34 and give up energy in the scintillator 22. The energy from these particles results in the scintillator 22 giving off light at a wavelength (e.g. green) different from that of any Cerenkov light (e.g. blue to ultraviolet).

The scintillator light travels through the light pipe 24 to and through the filter 32. The scintillator light then enters the face 18 of the tube 12 where it produces an electrical signal indicative of the light entering the tube 12.

The Cerenkov light produced in the light pipe 24 by higher energy particles and photons is partially absorbed by the ultraviolet absorbing characteristics of the light pipe 24. The remaining Cerenkov light is absorbed by the filter 32. Gamma rays and x-rays entering the light pipe 24 are attenuated to an acceptable level prior to striking the cathode of the tube 14. The light pipe 24 serves to provide both a back scattering equivalent to that of deeper tissue and to minimize the amount of current directly produced in the tube 12 by the higher energy particles, gamma rays and x-rays.

Because the Cerenkov light is removed before detection by the tube 12 and directly produced current from gamma rays and x-rays is minimized, no pulse discrimination electronics are required to process the electrical signal from the tube 12. Instead, the electrical output of the tube 12 provides a direct measurement of the beta particles detected. For example, the beta dose rate may be measured by the probe 10 and the circuit of U.S. Pat. No. 4,880,981, which is incorporated herein by reference in its entirety.

Referring to FIG. 4, another embodiment of a beta scintillation probe 10' according to the invention is depicted.

The light pipe 24' is made of a non-ultraviolet absorbing plastic, for example, Dupont LUCITE without any ultraviolet absorbing additives.

In addition to the filter 32, another filter 40 (e.g. an Eastman Kodak Company WRATTEN filter #3) is located between the scintillator 22 and the light pipe 24. The scintillator 22 and the filter 40 may be adhesively attached to one another and the light pipe 24. The adhesive may be an epoxy such as Bicron Corporation BC-620.

Referring to FIG. 5, another embodiment of a beta scintillation probe 10" according to the invention is depicted. The probe 10" is similar to the probe 10 of FIGS. 1-3, except that the opaque plastic ring 26' is shortened in length (e.g. 0.3937 inches) and the remainder of the light pipe 24 is surrounded by a metal ring 42, preferably of lead or a lead alloy. This construction provides the tissue equivalent structure composed of the window 34 and the scintillator 22, the muscle-like backscattering of the plastic ring 26' and the shielding of the light pipe 24 and the photomultiplier tube 12 by the metal ring 42 to minimize effects from high energy x-rays and gamma rays entering the probe 10" transversely to the axis of the light pipe 24.

Referring to FIG. 6, a beta scintillation probe 10''' similar to the probe 10" of FIG. 6 is depicted. In the probe 10''' a light pipe is formed from a length of ultraviolet absorbing plastic 24" (e.g. 0.3937 inches) coupled to a length of lead glass 44 (e.g. 3.606 inches of SF-1 Schott Optical Glass). This configuration provides minimization of direct effects on the photomultiplier tube 12 by gamma and x-rays axially entering the probe 10'''.

The lead glass 44 absorbs the undesired x-rays and gamma rays while allowing the light from the scintillator 22 to pass to the photomultiplier 12.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A beta scintillation probe that rejects a Cerenkov light constituent, said probe comprising:
   a light-opaque window;
   a scintillator communicating with said window, said window and scintillator together forming a skin equivalent structure of between 5 mg/cm$^2$ and 10 mg/cm$^2$ and said scintillator being adapted to scintillate in the presence of beta particles at a wavelength different than that of the Cerenkov light constituent;
   a light pipe adapted to provide a light path for light from said scintillator;
   at least one optical filter adapted to block light at the wavelength of the Cerenkov light constituent in said light path;
   a light detection means in said light path, said detection means providing an electrical signal representative of beta particles entering said window.

2. A probe according to claim 1, wherein said window comprises at least one layer of aluminized polyester membrane.

3. A probe according to claim 1, wherein said scintillator produces green light in response to the beta particles.

4. A probe according to claim 1, wherein said scintillator produces orange light in response to the beta particles.

5. A probe according to claim 1, wherein said light pipe is comprised of a plastic that is transparent to scintillations from the scintillator but is absorbing to ultraviolet light.

6. A probe according to claim 1, wherein said light pipe is comprises a plastic portion that is transparent to scintillations from the scintillator but is absorbing to ultraviolet light and a lead glass portion.

7. A probe according to claim 1, further comprising an opaque ring having a bore, said bore coaxially containing said scintillator and light pipe.

8. A probe according to claim 7, wherein said opaque ring comprises a plastic portion and a metal portion.

9. A probe according to claim 1, wherein said at least one filter is between said light pipe and said light detection means.

10. A probe according to claim 1, wherein said at least one filter is between said scintillator and said light pipe.

11. A beta scintillation probe that rejects a Cerenkov light constituent, said probe comprising:
    a window formed of a plurality of layers of aluminized polyester;
    a green or orange scintillator communicating with said window, said window and scintillator together forming a skin equivalent structure of between 5 mg/cm$^2$ and 10 mg/cm$^2$;
    an ultraviolet absorbing light pipe communicating with said scintillator;
    an opaque plastic ring having a bore, said bore coaxially containing said scintillator and light pipe;
    an optical filter communicating with said light pipe, said filter being adapted to block light at blue and shorter wavelengths; and
    a photomultiplier tube communicating with said filter, said photomultiplier providing an electrical signal representative of beta particles entering said window.

12. A beta scintillation probe that rejects a Cerenkov light constituent, said probe comprising:
    a window formed of a plurality of layers of aluminized polyester;
    a green or orange scintillator communicating with said window, said window and scintillator together forming a skin equivalent structure of between 5 mg/cm$^2$ and 10 mg/cm$^2$;
    a first optical filter communicating with said scintillator, said filter being adapted to block light at blue and shorter wavelengths;
    a light pipe communicating with said first filter;
    an opaque plastic ring having a bore, said bore coaxially containing said scintillator, first filter and light pipe;
    a second optical filter communicating with said light pipe, said filter being adapted to block light at blue and shorter wavelengths; and
    a photomultiplier tube communicating with said second filter, said photomultiplier tube providing an electrical signal representative of beta particles entering said window.

13. A beta scintillation probe that rejects a Cerenkov light constituent, said probe comprising:
    a window formed of a plurality of layers of aluminized polyester;
    a green or orange scintillator communicating with said window, said window and scintillator together forming a skin equivalent structure of between 5 mg/cm$^2$ and 10 mg/cm$^2$;
    an ultraviolet absorbing light pipe communicating with said scintillator;
    a lead glass light pipe communicating with said ultraviolet absorbing light pipe;
    an opaque ring having a bore, said bore coaxially containing said scintillator and light pipes, said ring having a plastic portion and a metal portion;
    an optical filter communicating with said light pipes, said filter being adapted to block light at blue and shorter wavelengths; and
    a photomultiplier tube communicating with said filter, said photomultiplier providing an electrical signal representative of beta particles entering said window.

* * * * *